Feb. 23, 1926. 1,574,455
E. VELEN
HYDRODYNAMIC STEERING GEAR
Filed Dec. 12, 1922    4 Sheets-Sheet 2

Inventor
Enoch Velen,
By William F. Jacoli

Feb. 23, 1926.
E. VELEN
1,574,455
HYDRODYNAMIC STEERING GEAR
Filed Dec. 12, 1922 4 Sheets-Sheet 3
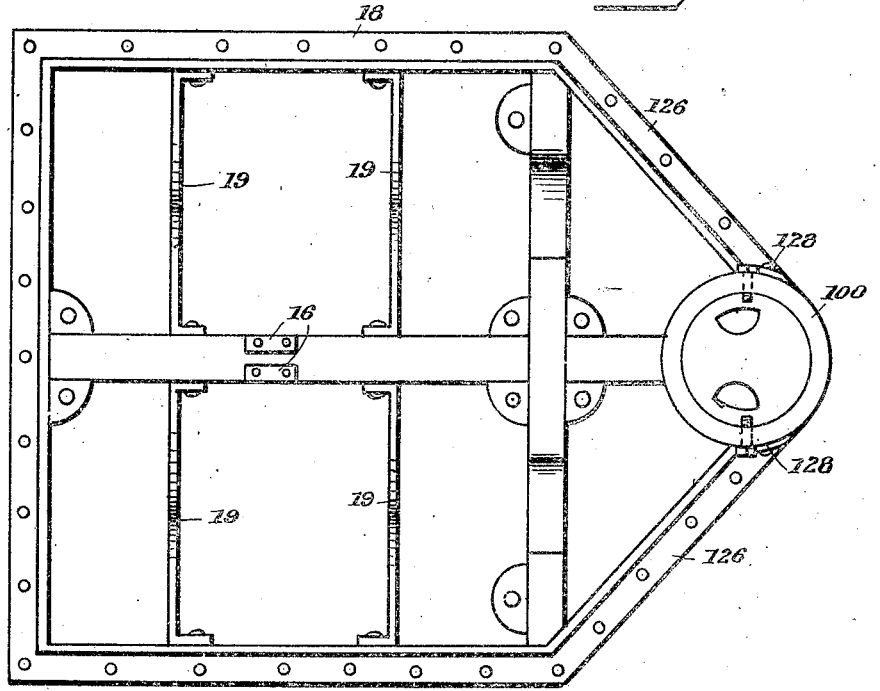
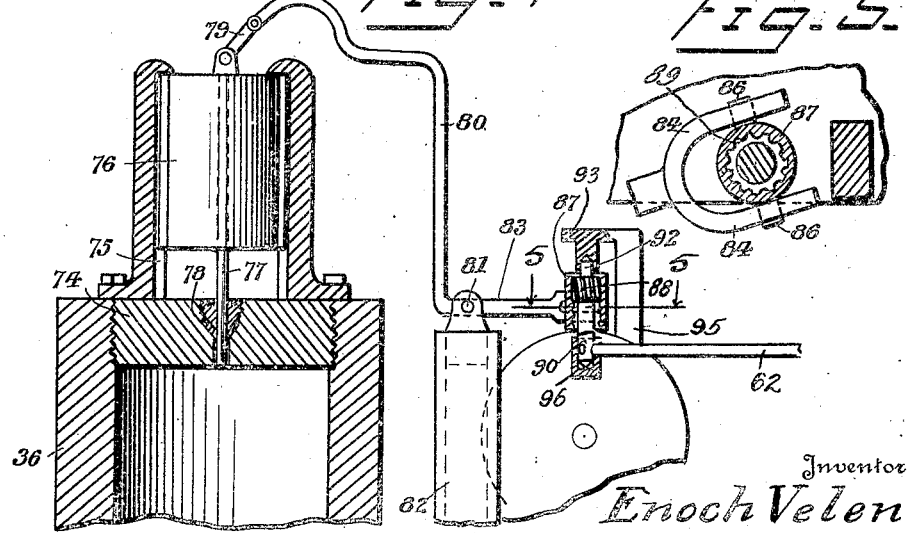

Feb. 23, 1926. 1,574,455
E. VELEN
HYDRODYNAMIC STEERING GEAR
Filed Dec. 12, 1922   4 Sheets-Sheet 4
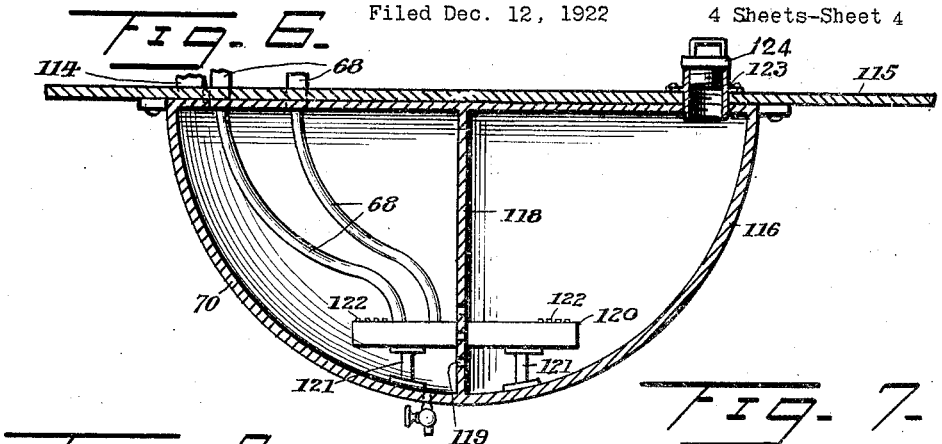
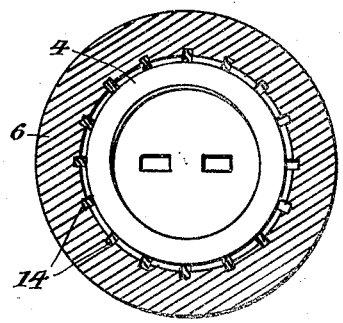
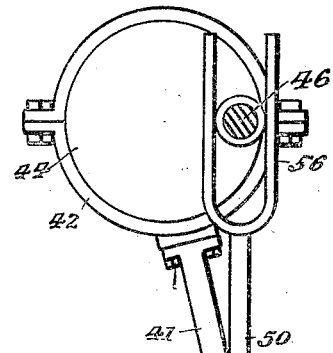
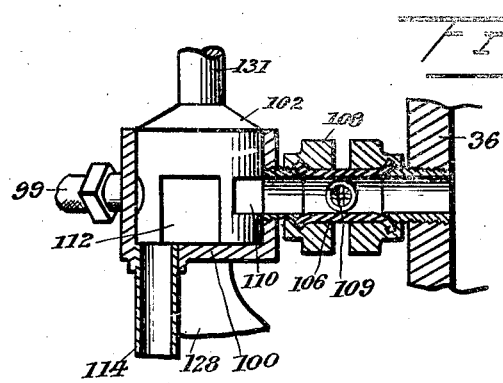
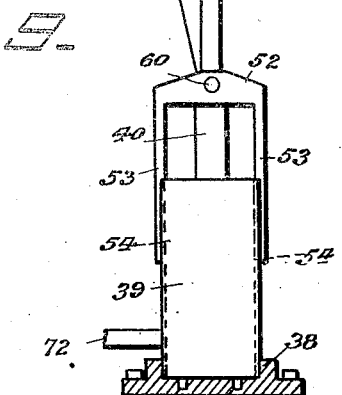
Inventor
Enoch Velen
By William J. Jaeckli
Attorney Patented Feb. 23, 1926.

1,574,455

UNITED STATES PATENT OFFICE.

ENOCH VELEN, OF NEW ORLEANS, LOUISIANA.

HYDRODYNAMIC STEERING GEAR.

Application filed December 12, 1922. Serial No. 606,543.

*To all whom it may concern:*

Be it known that ENOCH VELEN, a citizen of the United States of America, residing at New Orleans, in the parish of Orleans and State of Louisiana, has invented certain new and useful Improvements in Hydrodynamic Steering Gears, of which the following is a specification.

This invention relates to a hydrodynamic steering gear and particularly to a ship's steering gear which will quickly shift the position of the rudder from one extreme position to another and will effectively lock the rudder as so shifted.

The principal object of my invention is to provide a steering mechanism which will avoid and take the place of the ordinary control gear which includes the usual steering wheel requiring quite often a great number of turns to bring the rudder from one extreme position to the other and which necessitates the helmsman holding the wheel in the adjusted position. By my arrangement, the rudder may be speedily changed from one position to another by the simple turning of a valve.

The principal features of construction upon which my invention is based embody a multiple cylinder fluid pressure engine, operatively connected with the rudder, a reservoir or accumulator in which the fluid, in the present instance, water, is stored under pressure from a pumping mechanism and a manually controlled valve for alternately placing the units of the multiple cylinder engine in communication with the source of fluid under pressure.

In the accompanying drawing,

Figure 3 is a top plan view of the base or supporting foundation for the apparatus;

Figure 4 is a side view partly in section on line 4—4 of Figure 2 and partly in elevation of the pump controlling mechanism;

Figure 5 is a horizontal section on the line 5—5 of Figure 4;

Figure 6 is a vertical sectional view of the tank which supplies water to the pumps;

Figure 7 is a vertical elevation of one of the pumps, its operating and stabilizing attachment;

Figure 8 is a horizontal sectional view thru one of the elements of the fluid pressure engine, and, Figure 9 is a vertical section on the line 9—9 of Figure 2 thru the valve casing 100 and the pipe thru which it connects with the accumulator.

Figure 1:
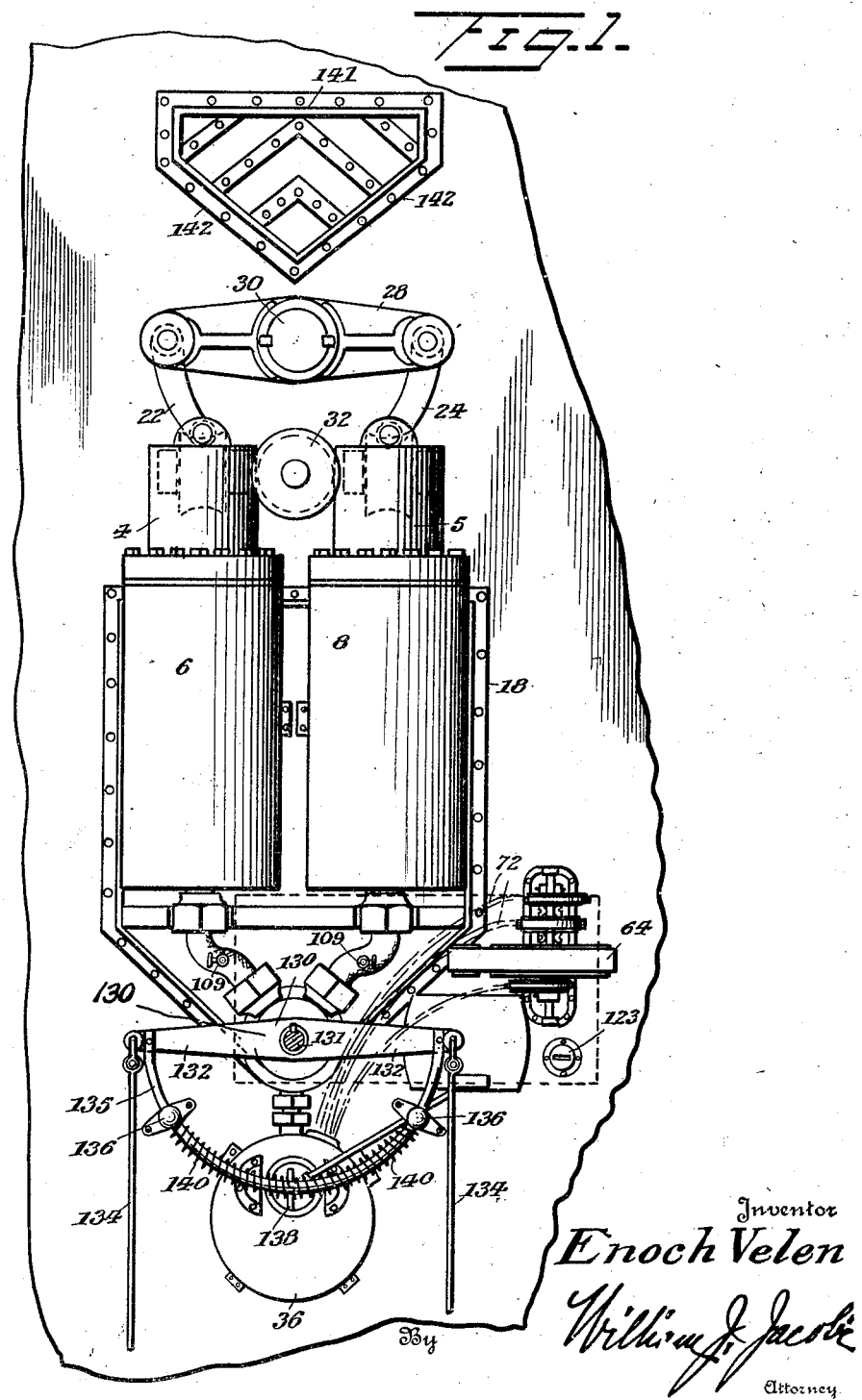
Figure 1 is a top plan view of the apparatus.

Referring now to the drawings by numerals of reference which indicate like parts thruout the several figures, I have shown generally by the numeral 2 a fluid pressure engine which specifically embodies a pair of oppositely acting, reciprocatory pistons 4 and 5 operating within cylinders 6 and 8 said cylinders being arranged in parallel relation.

Since the construction of the pistons and cylinders are identical, a description of one will suffice. The cylinders each comprise, in addition to the cylinder proper, a separable head 9 screwed as at 10 into one end thereof, the other end, thru which the piston moves being provided with a soft copper ring 11, between which and the edge of the cylinder is clamped a packing ring or gasket 12, which, while it may be formed of any material suitable for the purpose, is preferably of a laminated structure composed of superposed rubber and oil treated leather rings. It is also preferable to form each cylinder of two longitudinal centrally divided sections which are suitably clamped together to provide a unitary structure, altho each cylinder may be initially cast as an integral structure. The inner wall of each cylinder is provided with a series of spaced longitudinal grooves within which are seated packing strips 14 of the same material as forms the gasket or packing ring 12.

The cylinders are supported upon and suitably clamped, as by fastenings 16 upon a generally rectangular base or foundation 18 secured to the deck of the vessel, the cylinders reposing within concaved transverse beams 19 secured at their ends in the principal frame members of the foundation or base 18. I have further found it preferable, especially from a standpoint of ease of assembly, to provide the pistons 4 and 5 with removable heads 20 and 21.

The outer ends of the pistons 4 and 5 are respectively connected thru their movable rods 22 and 24, which in turn are pivoted as at 25 and 26 to the opposite ends of a rocking beam or arm 28. The beam or arm 28, at its longitudinally central portion is keyed or splined to the vertical rudder post 30.

For the purpose of taking up the side thrust of the pistons during their reciprocatory movements, I arrange between them, adjacent their outer ends, a bearing roller 32, on a shaft 33, the roller being provided with an annular recess 34 conforming to the outer contour of the pistons.

The weight of the pistons at their outer ends is taken off the rods 22, the beam 28 and the connection therefor thru the medium of supporting wheels or rollers 35 which may roll on the face of the deck or may be formed to travel on horizontal guide rods, not shown.

The motive fluid which is admitted under proper pressure to the expansion space within the cylinders, and which motive fluid in the present instance is water, is supplied from a tank or accumulator 36, by a conveying or conducting means to be later described. For the purpose of supplying the tank of accumulator 36 with water under pressure, I provide a series of reciprocating pumps 38, individually comprising, in addition to the cylinder 39 a pump rod 40 connected thru a pitman 41 with a strap or band 42 which co-operates with an eccentric 44 rigidly mounted upon the crank shaft 46 and which latter is journalled at its ends in suitable bearings in the pump frame 48. For the purpose of steadying the action of the pump, and for the purpose of eliminating side thrust of the piston and its rod 40, I arrange in connection with each individual pump, a guide which comprises a vertical rod 50 having at its lower end a yoke 52 provided with depending lateral arms 53 which co-operate with guiding grooves 54 in opposite sides of the cylinder, the upper end of said rod having a bifurcated portion 56 which straddles the crank shaft 46. The pivoted point 60 between the rod 50 and the yoke 52 also forms the pivotal point between the pump rod 40 and the pitman 41.

The pumps are driven thru the medium of a steam turbine 61 which is supplied with steam from a suitable source thru a pipe 62, the shaft 63 of the turbine being geared as by a belt 64 with a pulley 66 fast on the crank shaft 46. On the suction stroke of each pump, water is drawn within the cylinder 39 thru pipes 68 the ends of which are immersed within a tank 70 to be later described, and on the compression stroke are discharged thru pipes 72 into the tank or accumulator 36. The several units of the pump are well balanced by arranging or relatively offsetting the eccentrics 44, substantially 120 degrees around the axis of the crank shaft 46.

Mounted upon the top plate 74 of the accumulator within guides 75, is a pressure governor weight 76 having upon its lower end a steel stem 77 which reciprocates thru a central aperture in the said top plate 74, a packing gland 78 being provided to prevent leakage around the stem. The upper end of the weight is pivotally connected thru a link 79 with the long arm 80 of a lever pivoted at 81 on a standard 82 mounted on the deck of the vessel. The short arm 83 of the lever is bifurcated to form arms 84 which straddle and support on trunnions 86, a sleeve 87 having an internal steep pitch screw 88 which is geared with an enlarged geared portion 89 on the stem of a rotary valve 90. The valve is journaled at its upper end thru a spindle 92 in the bearing 93 supported by a bracket 95 rigidly mounted on the frame of the turbine 61, while the lower end is stepped in a cup-shaped valve casing 96 having a port in communication with the steam supply pipe 62 and adapted for registry with the port in the valve 90 to place the said pipe in communication with the expansion chamber of the turbine. The ports in the valve and valve casing are so arranged, that when the pressure within the accumulator is sufficient to overcome the weight 76, and the latter lifted thru the interconnected and intergeared parts 80, 83, 88 and 89, the valve 90 will be rotated an extent, sufficient to move the ports in the valve and valve casing out of registry thus cutting off the supply of steam to the turbine and stopping the action of the pump.

Fluid pressure to alternately operate the pistons 4 and 5 of the engine 2, is supplied to the latter from the tank or accumulator 36 thru the medium of pipes 98, and 99 connected respectively at one end with the head 9 of the cylinders 6 and 8 and at their other ends with the casing 100 of a three port rotary valve 102, couplings 104 such as will afford fluid tight joints being provided. The valve casing 100 is itself in communication with the tank or accumulator thru a relatively short length pipe 106, suitable couplings 108 being arranged to provide fluid tight joints. Each of the pipes 98, 99 and 106 is provided with a safety valve 109 so that any or all the pipes may be closed to interrupt passage of the fluid when repair or replacement becomes necessary. The inlet port 110 of the valve 102 is so formed that communication between either of the pipes 98 and 99 individually and the pipe 106 from the accumulator 36 may be established, exhaust ports 112, upon opposite sides of the inlet port 110 serving to permit the non-operating cylinder to exhaust its content while fluid under pressure is being supplied to the other cylinder. The base of the valve casing is provided with exhaust pipes 114 which alternately register with the exhaust ports 112 of the rotary valve 102.

Secured in any suitable manner to the under surface of the deck 115 and preferably beneath the pump, is a semi-circular tank 116, provided with a central vertical partition 118 the lower portion of which is transversely apertured as at 119 to permit an equilibrium of the water therein to be established. The pipes 68 which supply the water to the pumps 38 pass thru the deck 115 and the roof of the tank 116 and are coupled to a filter or strainer casing 120 supported on legs 121 on the floor of said tank, the inlets to said casing 120 having suitable filtering or straining screens 122 for obvious purposes. The exhaust pipes 114 discharge into the tank 116 so that the water is re-used without material waste. A filling tube 123, closed by a screw cap 124 is for the purpose of filling the tank or replenishing the supply when necessary. The rotary valve 102 has its casing 100 supported by extensions 126 of the side frames of the foundation or base 18, said extensions converging forwardly and provided with brackets 128 secured to the opposite sides of said valve casing 100.

The valve 102 which places either of the cylinders 6 or 8 in communication with the accumulator 36, is operated or controlled thru the medium of a rocking lever 130 which is splined intermediate its ends on the valve stem 131, the terminals of the arms 132 of said lever being connected with cables or wires 134 which lead to the pilot house on the vessel and are under the immediate control of the helmsman.

Figure 2:
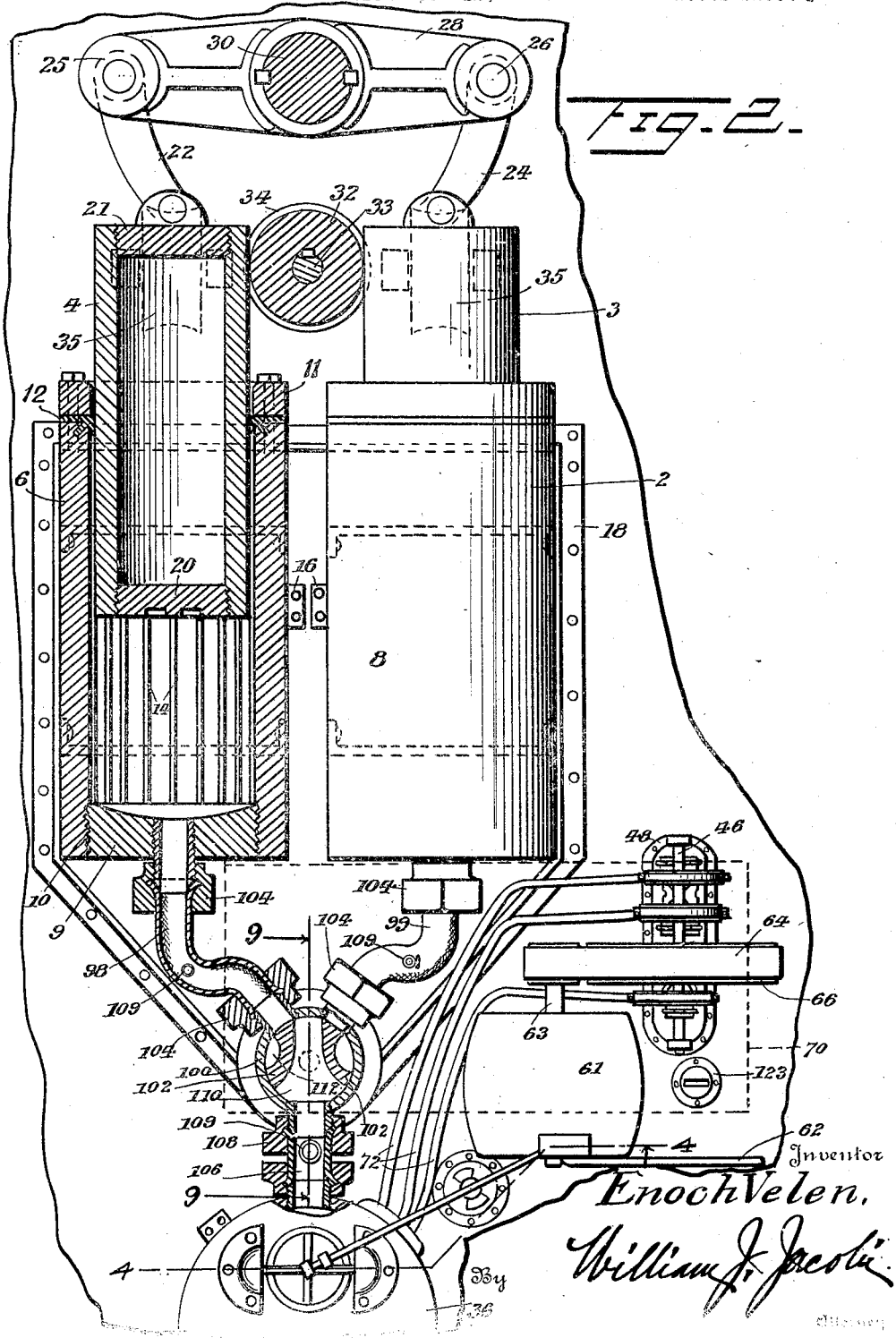
Figure 2 is a view somewhat similar to Figure 1, certain of the parts being shown in horizontal section to illustrate details of internal construction.

The rocking lever 130 is maintained in the position shown in Figure 1 to place the valve 102 in an intermediate or neutral position as shown in Figure 2 thru the medium of an arcuate guide rod 135 fastened at its ends respectively adjacent the terminals of the arms 132, said rod 135 operating thru guides 136 preferably mounted on the deck, and an intermediate fixed member 138, between which latter and the guides 136 the guide rod is supplied with encircling coiled compression springs 140. It is obvious that the springs 140 being of equal strength will maintain the lever 132 and valve 102 in neutral position, the guides 136 acting also as stops to limit the swinging movements of the arms 132 of the lever 130 to an extent which will permit the establishment of communication between the several ports of the valve and the pipes 98, 99, 106 and exhaust ports 114.

Arranged securely upon the deck of the vessel and in the rear of the engine 2 is a bumper 141, having forwardly converging lateral frame members 142 which respectively co-operate with the arms of the beam 28 to limit their arc of movement to an angle of approximately 45 degrees.

It is believed that from the foregoing, the many objects and advantages of my invention will be clear and appreciated, especially by those familiar with navigation, and while in very many instances I have referred to the elements of the apparatus specifically as to their size and dimensions, I wish it understood that variations may readily be made in the construction which will result in variations in pressures, capacities, weight, etc. without departing from the spirit of the invention as defined by the following claims.

What I claim and desire to protect by Letters Patent is:

1. The combination with a ship's rudder shaft, of a pair of horizontally arranged cylinders having one end open, pistons arranged in the cylinders, operative connections between the pistons and rudder shaft, a source of compressed fluid, a three-way valve controlling communication between the cylinders and source of compressed fluid, and adapted to operate said cylinders, means for actuating the valve, comprising a lever fixed intermediate its ends to rotate with the valve, an arcuate guide member fixed to the ends of the lever and flexible elements connected with the ends of the lever whereby the latter may be rocked in the desired direction whereby to establish communication between the desired cylinder and source of compressed fluid.

2. The combination with a ship's rudder shaft, of a pair of horizontally arranged cylinders having one end open, pistons arranged in the cylinders, operative connections between the pistons and rudder shaft, a source of compressed fluid, a three-way valve controlling communication between the cylinders and source of compressed fluid and adapted to operate said cylinders, means for actuating the valve comprising a lever fixed intermediate its ends to rotate with the valve, an arcuate guide member fixed to the ends of the lever, guides through which the arcuate member passes, expansible coil springs encircling the arcuate member and disposed upon opposite sides of one of the guides and engaging the same, and normally urging the arcuate member to a position where the valve will be disposed in closed position, and flexible elements connected with the ends of the lever whereby the latter may be rocked in the desired direction whereby to establish communication between the desired cylinder and source of compressed fluid.

In testimony whereof I affix my signature.

ENOCH VELEN.